United States Patent Office 3,058,982

Patented Oct. 16, 1962

3,058,982

AROMATIC AMINOALKYL-HYDRAZINIUM COMPOUNDS

Bernard Rudner, Pittsburgh, Pa., Richard A. Bafford, Baltimore, Md., and Aristotle G. Prapas, Haddonfield, N.J., assignors to W. R. Grace & Co., New York, N.Y., a corporation of Connecticut No Drawing. Filed June 13, 1960, Ser. No. 35,390
6 Claims. (Cl. 260—256.4)

This invention relates to organic nitrogen compounds. In one specific aspect, it relates to aromatic amines which are also alkyl-hydrazinium compounds. This application is a continuation-in-part of our copending application Serial No. 770,596, filed October 30, 1958, now abandoned.

The compounds of our invention are conveniently prepared by the action of chloramine on the appropriate alkylene diamine. In the preferred practice of our invention, the reactant amine dissolved in an unreactive solvent is exposed to a stream of gaseous chloramine. The resultant aromatic aminoalkyl-hydrazinium chloride is isolated by conventional laboratory techniques. Compounds containing anions other than chloride are prepared by metathesis, starting with the chloride and a compound containing the anion to be introduced.

Our novel compounds possess anti-histaminic properties and are useful for treatment of allergies in animals. For such use, they may be made into pharmaceutical solutions, tablets or capsules for oral ingestion. The salts of the antibiotics, sulfa compounds, phenates, benzoates, camphorates and the like, may be compounded with grease bases to form ointments, which have bactericidal properties, for topical application in treating burns or abrasions to prevent infections. The longer chain compounds ($C_{12}$ or longer) have surface activity and may be used as ingredients of detergents or as bactericidal agents, especially in secondary oil recovery.

The foregoing are typical of the many uses for our novel compounds. Other uses will be obvious to those skilled in the art.

It is, therefore, an object of the present invention to provide a new class of pharmacologically useful aromatic compounds.

In accordance with the present invention, we have made available a new class of hydrazinium compounds and their salts, the compounds having the general formula:

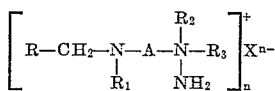

In the above formula, R is selected from the group consisting of phenyl, thienyl, furyl and their nuclear halo, lower alkoxy and lower alkyl derivatives. $R_1$ is selected from the group consisting of phenyl, pyridyl, pyrimidyl and their halo and lower alkyl derivatives. $R_2$ and $R_3$ are lower alkyl radicals; A is a bivalent alkylene radical containing 2 to 6 carbon atoms inclusive. X is an anion bearing the charge *n*; *n* is also the number of cations required to balance the anionic charge. Since our novel compounds are often isolated or used as their acid addition salts and since the basic amine compound is readily obtainable from its addition salts by the addition of a stronger base, such addition salts come within the scope of our invention.

When our compounds are used for pharmaceutical purposes, X must be a pharmaceutically acceptable anion. The primary attributes of such an anion are nontoxicity and pharmaceutical campatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate, and the like.

One method of preparing the novel compounds of our invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. 1, 59 (1939). Alternatively, the chloramine can be formed in the presence of the amine as described in the copending application Serial No. 605,230, filed August 20, 1956, now abandoned, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent, it is meant a solvent unreactive under the condition of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and cellusolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of our invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of our invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

Suitable starting amines for the synthesis of our compounds by the methods previously discussed include:

2-(N-benzyl-3-methoxyanisidino)propyldimethylamine
N-(5-bromo-3-thenyl)-N-(2-diethylaminoethyl)-3-aminopyridine
4,6-diethoxy-2-[N-(2-diethylaminoethyl)anilino]pyrimidine
N-(2-thenyl)-N-benzyl-N',N'-dimethylethylenediamine
N-(3-chloro-4-methoxyphenyl-N-(2-furyl)-N',N'-dimethyl-2,3-butanediamine.

The compounds of our invention may also be prepared by the classical alkylation of hydrazine. The reaction of a disubstituted aminoalkyl halide with an unsymmetrical dialkyl hydrazine is illustrated below:

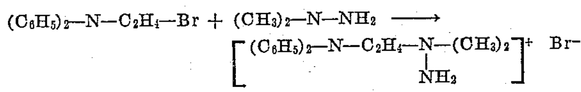

The presence of the hydrazinium function on the molecule does not affect the ability of the other nitrogen function in the molecule to form salts with acids. Sometimes the acid salts of our novel hydrazinium compounds are isolated directly being formed during the course of the same reaction that created the hydrazinium linkage. For example, the ammonium chloride present from chloramine formation and/or decomposition may react with the product to form the hydrochloride salt as in Example XI, or by the reaction of hydroxylamine-o-sulfonic acid where the adduct is a bisulfate as in Example VI. These mineral acid salts come within the scope of our invention as do similar salts, i.e., the hydrobromide, the acid phosphates, the picrate, the acetate, etc.

The scope and utility of our invention is further illustrated by the following examples:

*Example I*

Methapyrilene hydrochloride (Thenylene hydrochloride) is a commercially available antihistaminic known chemically as N-(2-pyridyl)-N-(2-thenyl)-N',N'-dimethylethylenediamine. It was converted to the free base by treating 63.5 g. dissolved in 150 ml. of water with excess sodium carbonate in the presence of 300 ml. of chloroform. The organic layer was separated, dried over magnesium sulfate, filtered and made up to a volume of one liter with additional dry chloroform. Using the chloramine generator of Sisler et al. described in U.S. Patent 2,710,248, the chloroform solution of the free base was treated with about 10 g. of chloramine over a period of two hours and allowed to stand overnight. After filtration from the resultant ammonium chloride, the reaction mixture was evaporated to yield a brown oil containing some solid. Trituration of this residue with ether followed by filtration gave 31.5 g. of crude 1,1-dimethyl-1-(N-2-thenyl-N-2-pyridyl-2-aminoethyl)hydrazinium chloride. The product was recrystallized several times from the binary solvent systems nitromethanedimethylformamide and acetonitrile-isopropyl alcohol to give off-white, somewhat hygroscopic crystals melting at 74° C. It was soluble in water, chloroform and methyl alcohol, partly soluble in isopropyl alcohol and dimethylformamide, and insoluble in benzene and ether. The elemental analysis of the product is consistent with the reaction shown below.

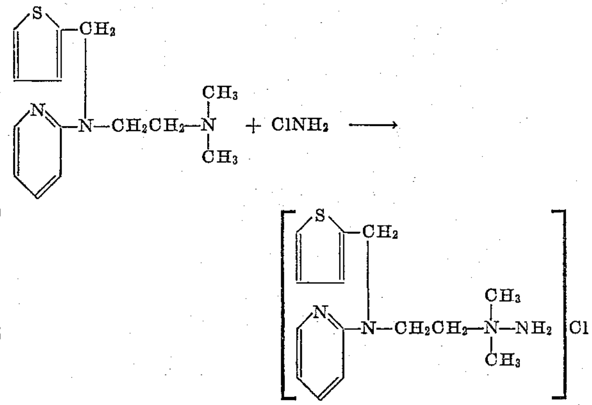

*Example II*

Treatment of an aqueous solution containing about 100 mg. of the product of Example I with excess picric acid in the form of its saturated aqueous solution gave an immediate yellow precipitate. After standing about two hours, the precipitate was collected by filtration and washed with water till the washings were colorless. The dried product was recrystallized from ethyl alcohol to give the yellow dipicrate melting at 112° C. Calculated for $C_{26}H_{26}N_{10}SO_{14}$: Percent C, 42.5; percent H, 3.57; percent N, 19.1; and percent S, 4.36. Found: Percent C, 42.8; percent H, 3.37; percent N, 18.5; and percent S, 4.49.

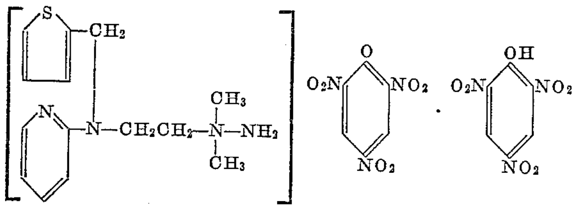

Heating 50 mg. of the dipicrate and 0.5 g. sodium carbonate in 20 ml. of water removed the second mole of picric acid. The hydrazinium picrate was collected by filtration from the cooled reaction mixture, washed well with warm water, dried and recrystallized from ethyl alcohol. The monopicrate was a somewhat tacky microcrystalline solid softening at 83° C. and running clear at 106° C.

*Example III*

A solution of 0.3 g. of the product from Example I in 20 ml. isopropyl alcohol was mixed with 0.37 g. of potassium penicillinate G in 30 ml. of the same solvent. After refluxing for 20 minutes, the reaction mixture was cooled, filtered from the resultant potassium chloride, and evaporated dry in a stream of nitrogen. The clear resinous residue was warmed with acetone and filtered from the insoluble reactants. Addition of the filtrate to a five volume excess of ether precipitated the product. After a repetition of the purification, the product was collected by filtration and dried. 1,1-dimethyl-1-(N-2-thenyl-N-2-pyridyl-2-aminoethyl)hydrazinium benzylpenicillinate was a tacky solid melting 82–83° C., insoluble in chloroform or ethyl acetate and only partially soluble in water.

*Example IV*

A solution of 0.3 g. of the product from Example I in 20 ml. of isopropyl alcohol was mixed with 0.2 g. sodium barbital in 30 ml. of the same solvent. After refluxing for 30 minutes, the reaction mixture was filtered hot from the resultant sodium chloride. On cooling, light yellow crystals of 1,1-dimethyl-1-(N-2-thenyl-N-2-pyridyl-2-aminoethyl)hydrazinium 5,5-diethylbarbiturate separated. After two further recrystallizations, the product sublimed to fine needles ca. 148° C. and melted with decomposition ca. 179° C.

*Example V*

The procedure of the previous example was repeated using, instead of sodium barbital, 0.34 g. of the sodium salt of 1,5-dimethyl-2-phenyl-3-pyrazolonyl-4-(N-methyl)aminomethanesulfonic acid, commercially available as the medicinal Novalgin. Here the product was a chloride-free, hygroscopic water soluble thick yellow oil. 1,1-dimethyl - 1 - (N-2-thenyl-N-2-pyridyl-2-aminoethyl)hydrazinium phenyldimethylpyrazolonyl-methylaminomethane-sulfonate decomposed with gas evolution ca. 122° C.; it was converted in aqueous solution to the dipricrate of Example II melting at 112° C.

*Example VI*

Thonzylamine hydrochloride is a commercially available pharmaceutical known chemically as N-p-methoxybenzyl - N - 2-pyrimidyl-N',N'-dimethylethylenediamine. It was converted to the free base by dissolving 1.6 g. in 25 ml. of methyl alcohol and adding just enough 10% aqueous sodium hydroxide to hold the reaction mixture at a pH of 9. After a solution of 0.57 g. of hydroxylamine-o-sulfonic acid dissolved in 10 ml. of methyl alcohol had been added, the reaction mixture was allowed to stand at room temperature for three days. During that time, white crystals slowly separated from the colorless solution. The high melting crystals were collected by filtration and recrystallized from ethyl alcohol. The structure of the product as a trialkylhydrazinium sulfate rather than as an amine sulfate is shown by its stability to aqueous solutions of alkali and its strong reducing action. As shown by the structure given below, the product is believed to be 1,1-dimethyl-1-[N-(2-pyrimidyl)-N-(p-methoxybenzyl)aminoethyl]-hydrazinium acid sulfate.

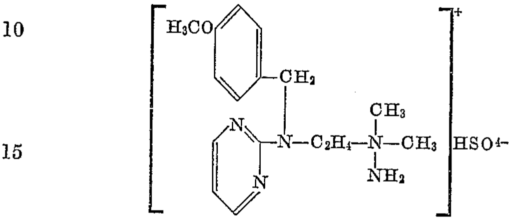

*Example VII*

A solution of 75 mg. of the product of the previous example in 5 ml. of deionized water was treated with 100 mg. of barium iodide dihydrate also dissolved in 5 ml. of water. After shaking well for two hours in a sealed test tube, the reaction mixture was filtered from the resultant barium sulfate and evaporated to dryness. The reddish residue was taken up in hot absolute alcohol and the solution treated with charcoal, filtered and evaporated to dryness. The new residue was dissolved in water and brought to a pH of 9 with sodium hydroxide, treated with charcoal, filtered and evaporated to dryness. The product was taken up in absolute alcohol and crystallized by pouring the solution into a five-volume excess of chloroform. After filtration and drying, 1,1-dimethyl-1-N-(2-pyrimidyl)-N-(p-methoxybenzyl)-aminoethylhydrazinium iodide melted and decomposed 156–158° C.

*Example VIII*

A small portion of the product of Example VI was treated with a saturated solution of calcium acid phosphate and aspirin, i.e., calcium o-acetoxybenzoate. The reaction mixture was filtered and the resultant precipitate of calcium sulfate and the filtrate brought to a pH of 8 with dilute sodium hydroxide. After a second filtration, the filtrate was evaporated to dryness. The residue was taken up with methyl alcohol and on evaporation of the solvent there was obtained 1,1-dimethyl-1-[N-(2-pyrimidyl) - N-(p-methoxybenzyl)aminoethyl]-hydrazinium o-acetoxybenzoate, a crystalline non-hygroscopic solid melting 98–101° C.

*Example IX*

Antergan hydrochloride is a commercially available pharmaceutical known chemically as N-phenyl-N-benzyl-N',N'-dimethylethylenediamine hydrochloride. Half a gram of the hydrochloride was dissolved in 20 ml. of methyl alcohol containing an equal weight of sodium methylate. A solution of 0.2 g. of hydroxylamine-o-sulfonic acid in 10 ml. of methyl alcohol was added cautiously resulting in the rapid precipitation of sodium sulfate. After sitting for two hours, the reaction mixture was heated to boiling and filtered hot washing the precipitate with more hot alcohol. The filtrate was evaporated to about 20 ml. and on chilling 1,1-dimethyl-1-(N-phenyl-N-benzylaminoethyl)hydrazinium sulfate crystallized from solution. After filtration and drying, the product melted with decomposition at 197–199° C.

*Example X*

About 100 mg. of the product of the previous example was treated with solid calcium gluconate. The reactants were heated to boiling and the reaction mixture was allowed to cool before being filtered from the precipitate of calcium sulfate. The residue obtained on evaporation of the filtrate was extracted with boiling ethyl alcohol. 1,1 - dimethyl - 1-(N-phenyl-N-benzylaminoethyl)hydrazinium gluconate decomposed and charred on heating but had an indefinite melting point ca. 168° C. The product is believed to have the following structure:

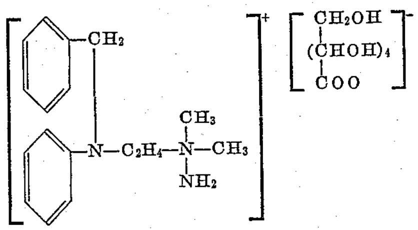

*Example XI*

Neoantergan maleate is a commercially available pharmaceutical known chemically as 2-[(2-dimethylaminoethyl)-(p-methoxybenzyl)amino]pyridine maleate. Fifty 25 mg. tablets of the maleate were crushed with 5 g. of sodium carbonate and 50 ml. of water was added. After the foaming had subsided, the reactants were boiled, cooled and extracted with three 20 ml. portions of chloroform. The lower (organic) extracts were combined, dried over magnesium sulfate, filtered and allowed to react with 0.51 g. of chloramine dissolved in 250 ml. of chloroform. After standing overnight, the reaction mixture was filtered from ammonium chloride and the filtrate evaporated to dryness. The 1.3 g. semi-solid residue was washed and triturated with ether yielding 0.92 g. of a hygroscopic product melting 128–131° C. The chloride titration suggested that it contained about 95% 1,1-dimethyl-1-[2-(N-benzylpyridyl-2-amino)ethyl]hydrazinium chloride and 5% of 1,1-dimethyl-1-[2-(N-benzylpyridyl-2-amino)ethyl]hydrazinium chloride hydrochloride. The former was obtained as off-white stubby needles melting 136° C. after purification by recrystallization from alcohol-benzene.

*Example XII*

Boiling a saturated aqueous solution of picric acid with the product of the previous example gave the dipicrate melting 171–172.5° C. with decomposition and having the structure:

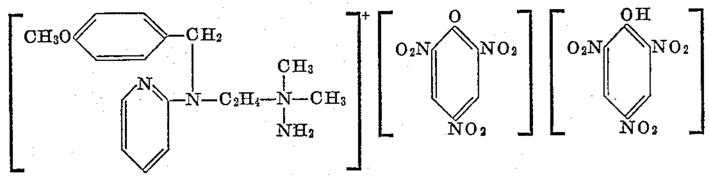

It cannot be definitely stated which basic nitrogen is associated with the proton from the second molecule of picric acid and the above formula only gives an approximate representation of the actual structure. The compound is named 1,1-dimethyl-1-[2-(N-benzylpyridyl-2-amino)ethyl]hydrazinium picrate hydrogen picrate.

*Example XIII*

A small evaporating dish containing 50 mg. of the product of Example XI and 100 mg. of salicylamide was kept in a vacuum oven at 60° C. and 3–5 mm. of Hg pressure for 6 hours. The cooled product was washed well with ether and then taken up in methyl alcohol. The filtered alcoholic solution was added to a four-volume excess of ether. After standing overnight, the precipitate was collected by filtration and recrystallized from ethyl acetate-ether. 1,1 - dimethyl - 1 - [2 - (N-benzylpyridyl-2-amino)ethyl]hydrazinium 2-carbamylphenolate melted with decomposition at 143–144° C. It is believed to have the following structure:

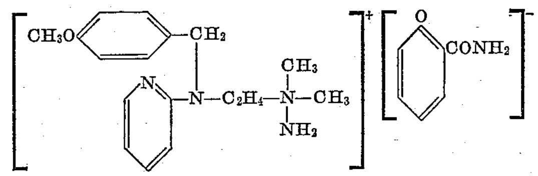

*Examples XIV and XV*

Separate aqueous solutions of the product of Example XI were mixed with concentrated aqueous solutions of silver nitrate and silver acetate. Each solution was filtered from the precipitate of silver chloride present and the filtrates brought to a pH of 8 with dilute sodium hydroxide. After a second filtration, the filtrates were evaporated to dryness and the residues extracted with methyl alcohol. Evaporation of the solvent gave 1,1-dimethyl-1-[2 - (N-benzylpyridyl - 2 - amino)ethyl]hydrazinium nitrate and acetate respectively as hygroscopic semi-solids. Neither could be crystallized by conventional techniques.

*Example XVI*

Chloroethen citrate is a commercially available pharmaceutical known chemically as 2-[N-(dimethylaminoethyl) - N - (5-chloro - 2 - thenyl)]aminopyridine citrate. Starting with ten 25 mg. tablets of Chloroethen citrate, essentially the same procedure was followed as used in Example XI with Neoantergan maleate. There was obtained a small yield of 1,1-dimethyl-1-[N-(2-pyridyl)-N-(5 - chloro - 2 - thenyl)aminoethyl]-hydrazinium chloride (melting 128–130° C.) believed to have the following structure:

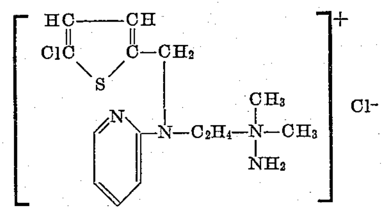

*Example XVII*

The anti-histaminic properties of our novel compounds were demonstrated by carrying out the following test procedure on a typical compound of our invention: A mongrel female dog weighing 8.4 kg. was anesthetized by the intraperitoneal administration of 100 mg./kg. of phenobarbital sodium and surgery was supported with intravenous pentobarbital sodium. The carotid artery was cannulated and connected to a mercury manometer for recording blood pressure and a femoral vein was exposed for introduction of test materials. The product of Example I, dissolved in physiological saline at concentrations of 1 and 100 mg./ml., was administered to the dog in intravenous doses of 0.01, 0.05, 0.25, 1.25, and 6.25 mg./kg. over a period of approximately three and one-half hours. A slight but transient rise in blood pressure was observed after doses of 0.25 and 1.25 mg./kg. The depressor response to histamine was apparently antagonized following each of the doses of the test compound; however, the response was never completely abolished. The study demonstrates that 1,1-dimethyl-1-(N-2-thenyl-N-2-pyridyl - 2 - aminoethyl)hydrazinium chloride has no profound effects on blood pressure or respiration. The antagonism to the depressor response of histamine suggests that the compound possesses anti-histaminic activity.

*Example XVIII*

The anti-histaminic activity of our novel compounds was further demonstrated by the isolated guinea pig smooth muscle technique. After the guinea pig was sacrificed by a blow on the head, its ileum was removed and terminal segments suspended in 100 ml. smooth muscle bath containing Tyrode's solution and maintained at 37° C. The bath was aerated by bubbling a continuous stream of oxygen through it. Intestinal activity was recorded by a balanced ink-writing lever yielding fivefold magnification on a conventional kymograph. Essentially, the method consisted of determining whether the test compound would prevent contractions of the isolated segments of ileum induced by histamine phosphate. A solution of 1 mg./ml. of the product of Example I was used as the test solution. A dosage of 25 micrograms in the 100 ml. bath partially inhibited contractions due to histamine and the contractions were completely inhibited by dosages of 50 mg.

*Example XIX*

Another technique used to study the anti-histaminic properties of our novel compounds was similar to that used by Loew et al., J. Pharmacol. Exptl. Therap., 83, 120 (1945). Guinea pigs were exposed by inhalation to histamine which was atomized under standard conditions to produce fatal broncho-constriction in 95% of the animals. Exposures were performed in a 500 liter stainless steel chamber with a water-sealed lid and equipped at the inlet with a suitable device for generation of an aerosol of histamine phosphate and at the outlet with an orifice flowmeter, filter control valves and exhaust pump. A constant rate of flow was maintained through the chamber at 35 liters per minute during the exposure by means of the exhaust pump. This rate of flow could be observed and controlled with the orifice flowmeter and valves. At the inlet to the chamber was a De Vilbiss nebulizer No. 180 charged with an aqueous solution of histamine phosphate at a concentration of 1:25 and operated by compressed air at a flow rate of 6.6 liters per minute. The aerosol discharge from the nebulizer was directed into the inlet where it mixed with the larger air flow through the chamber.

Animals of both sexes weighing 200 to 300 grams were used. All test compounds were prepared in water at concentrations of 1 to 10 mg./ml. and administered orally by stomach tube one hour before subjecting the guinea pigs to the atomized histamine solution. Five guinea pigs were used for each dosage level and at least three dosage levels were employed. Records were kept of the incidence of mortality. After the histamine was atomized for 15 minutes, fresh air was drawn through the chamber for a period of 5 minutes before removing the animals. The criterion for determining effectiveness in alleviating bronchoconstriction was a reduction in mortality of the animals exposed. The results with 1,1-dimethyl-1-(N-2-thenyl-N-2-pyridyl-2-aminoethyl)hydrazinium chloride are tabulated below:

| Dose (mg./kg.) | Animals Tested | Animals Living | Percent Protection |
|---|---|---|---|
| 0 (control | 30 | 2 | 6.7 |
| 0.1 | 5 | 0 | 0 |
| 0.316 | 5 | 1 | 20 |
| 1.0 | 5 | 4 | 80 |

We claim:

1. A compound selected from the group consisting of a compound of the formula:

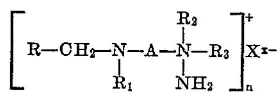

wherein R is a radical selected from the group consisting of phenyl, thienyl, furyl, halo phenyl, halo thienyl, halo furyl, lower alkoxy phenyl, lower alkoxy thienyl, lower alkoxy furyl, lower alkyl phenyl, lower alkyl thienyl and lower alkyl furyl; $R_1$ is a radical selected from the group consisting of phenyl, pyridyl, pyrimidyl, halo phenyl, halo pyridyl, halo pyrimidyl, lower alkyl phenyl, lower alkyl pyridyl and lower alkyl pyrimidyl; $R_2$ and $R_3$ are lower alkyl radicals; A is a bivalent alkylene radical containing 2 to 6 carbon atoms inclusive; and X is a non-toxic anion bearing the charge *n* and the non-toxic mineral acid salts of said compounds.

2. 1,1 - dimethyl - 1-(N-2-thenyl-N-2-pyridyl-2-aminoethyl)hydrazinium chloride.

3. 1,1 - dimethyl - 1 - [N-(2-pyrimidyl)-N-(p-methoxybenzyl)aminoethyl]hydrazinium acid sulfate.

4. 1,1 - dimethyl - 1 - (N-phenyl-N-benzylaminoethyl)-hydrazinium sulfate.

5 1,1 - dimethyl - 1 - [2-(N-benzylpyridyl-2-amino)-ethyl]hydrazinium chloride hydrochloride.

6. 1,1 - dimethyl - 1 - [N-(2-pyridyl)-N-(5-chloro-2-thenyl)aminoethyl]hydrazinium chloride.

No references cited.